United States Patent [19]
Edelson

[11] Patent Number: 5,774,110
[45] Date of Patent: Jun. 30, 1998

[54] FILTER RAMDAC WITH HARDWARE 1½-D ZOOM FUNCTION

[76] Inventor: Steven D. Edelson, 7 Sears Rd., Wayland, Mass. 01778-2101

[21] Appl. No.: 664,797

[22] Filed: Jun. 17, 1996

Related U.S. Application Data

[63] Continuation of Ser. No. 177,569, Jan. 4, 1994, abandoned.

[51] Int. Cl.⁶ .................................................. G09G 5/00
[52] U.S. Cl. ........................................ 345/131; 345/138
[58] Field of Search .................................. 345/127, 131, 345/138, 153–155; 395/139

[56] References Cited

U.S. PATENT DOCUMENTS

| | | | |
|---|---|---|---|
| 3,976,982 | 8/1976 | Eiselen ..................................... | 345/127 |
| 4,610,026 | 9/1986 | Tabata et al. . | |
| 4,796,016 | 1/1989 | Clark . | |
| 4,825,388 | 4/1989 | Dailey et al. . | |
| 4,843,380 | 6/1989 | Oakley et al. . | |
| 4,907,171 | 3/1990 | Nagashima . | |
| 4,931,785 | 6/1990 | Ishii ....................................... | 345/153 |
| 4,988,984 | 1/1991 | Gonzalez-Lopez . | |
| 4,991,022 | 2/1991 | Canfield et al. . | |
| 5,016,193 | 5/1991 | Stone et al. ............................. | 345/127 |
| 5,054,100 | 10/1991 | Tai . | |
| 5,065,144 | 11/1991 | Edelson et al. . | |
| 5,097,518 | 3/1992 | Scott et al. . | |
| 5,103,309 | 4/1992 | Hara . | |
| 5,113,455 | 5/1992 | Scott . | |
| 5,122,784 | 6/1992 | Canova . | |
| 5,125,043 | 6/1992 | Karlsson . | |
| 5,140,315 | 8/1992 | Edelson et al. . | |
| 5,166,810 | 11/1992 | Sorimachi et al. . | |
| 5,189,529 | 2/1993 | Ishiwata et al. . | |
| 5,206,919 | 4/1993 | Keating . | |
| 5,218,350 | 6/1993 | Bollman . | |
| 5,283,562 | 2/1994 | Kaneko et al. . | |
| 5,299,029 | 3/1994 | Moriya et al. . | |
| 5,313,231 | 5/1994 | Yin et al. . | |
| 5,373,311 | 12/1994 | Strait et al. ............................. | 345/127 |
| 5,389,947 | 2/1995 | Wood et al. ............................ | 345/153 |

FOREIGN PATENT DOCUMENTS

| | | |
|---|---|---|
| 0 082 746 | 6/1983 | European Pat. Off. . |
| 0 588 499 | 3/1994 | European Pat. Off. . |
| 0 610 829 | 8/1994 | European Pat. Off. . |
| 2 245 394 | 1/1992 | United Kingdom . |

OTHER PUBLICATIONS

"Bt885 135 MHz Monolithic CMOS Video CacheDAC™," *Brooktree*, 1993, pp. 1–52.
*Television Engineering Handbook*, K. Blair Benson, Ed., McGraw–Hill Book Co., New York, 1986, Section 19.1, pp. 19.2–19.9.

*Primary Examiner*—Jeffery Brier
*Attorney, Agent, or Firm*—Lane, Aitken & McCann

[57] ABSTRACT

In a pixel based display system, zoom logic is added to the data stream of a RAMDAC. In the zoom logic, horizontal lines of image data are stored in locations spaced apart in an intermediate frame buffer. The horizontal scan lines are read into a single line buffer and then the data is read from the single line buffer to generate an enlarged display image. Digital filtering may be employed to generate interpolated values for pixels between the original values in the zoomed image.

16 Claims, 8 Drawing Sheets

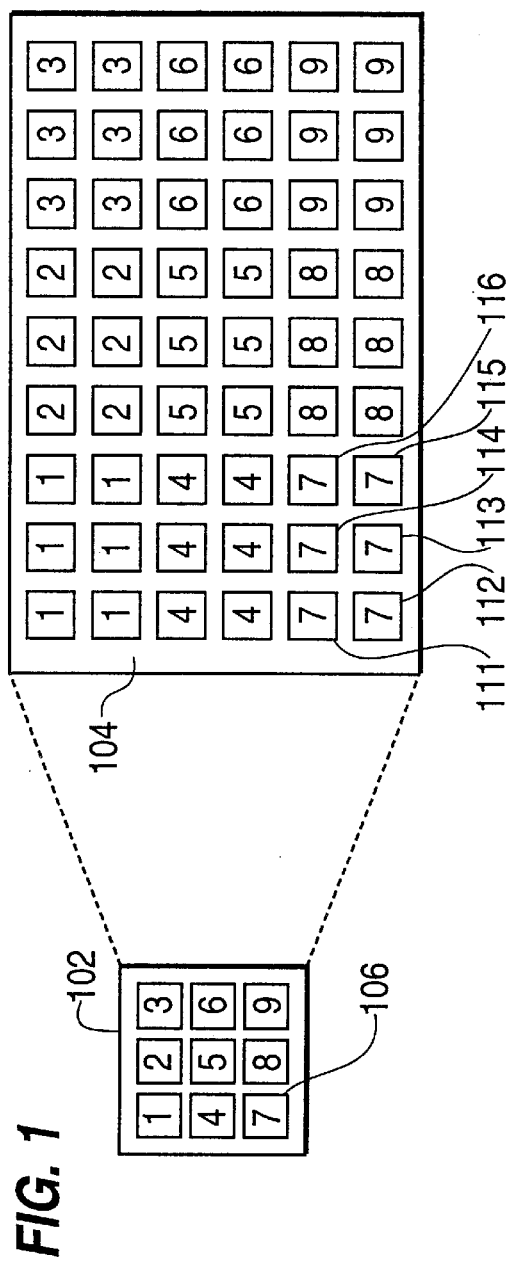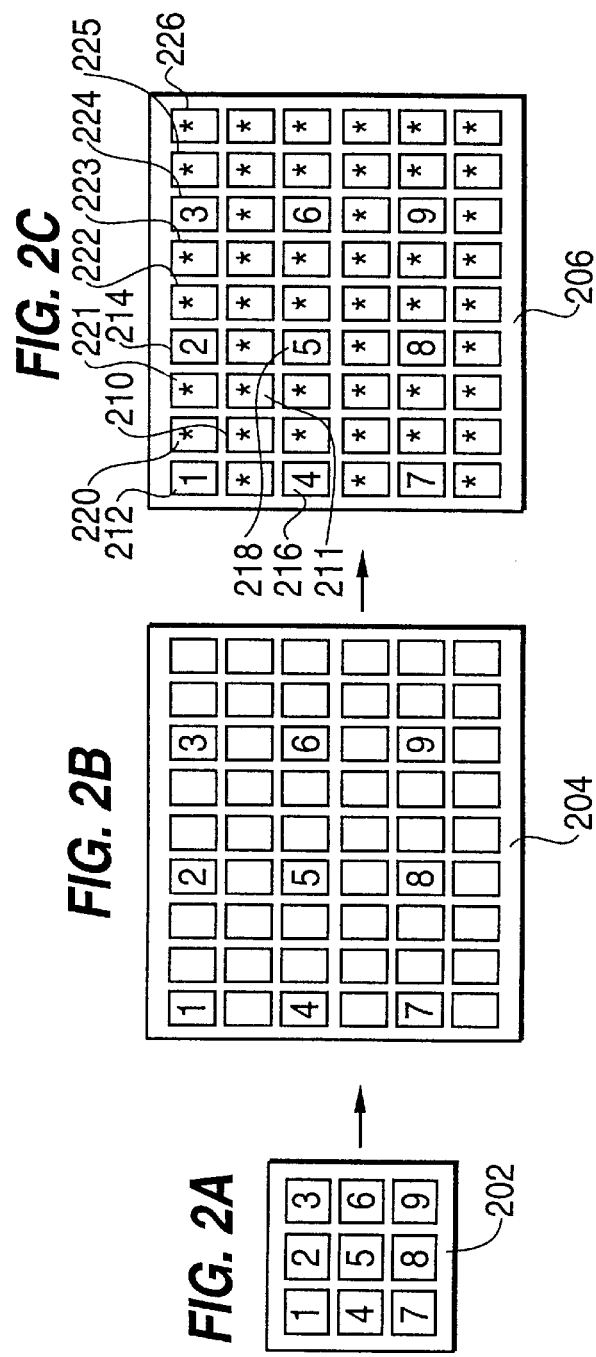

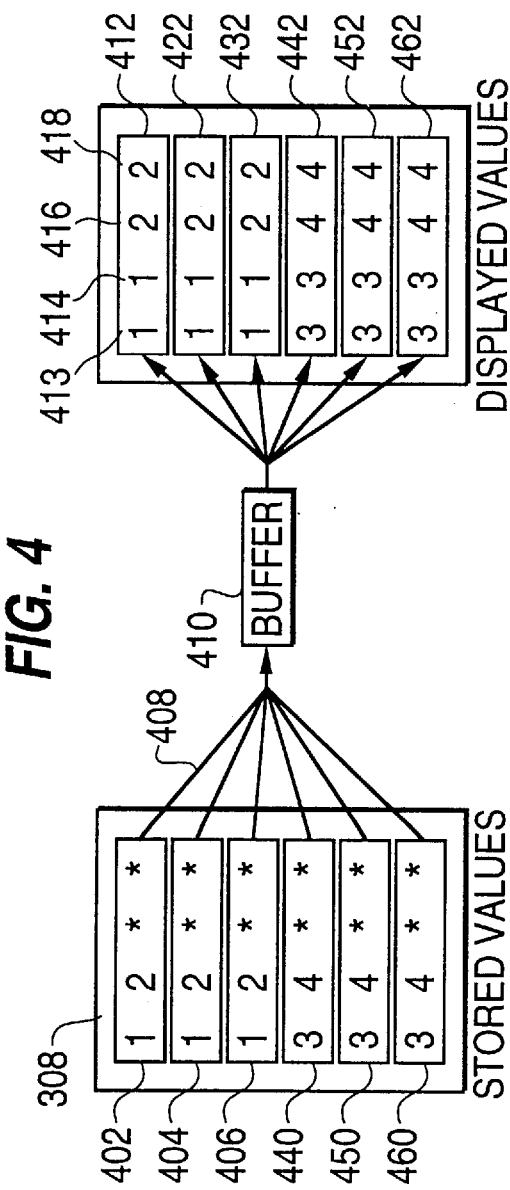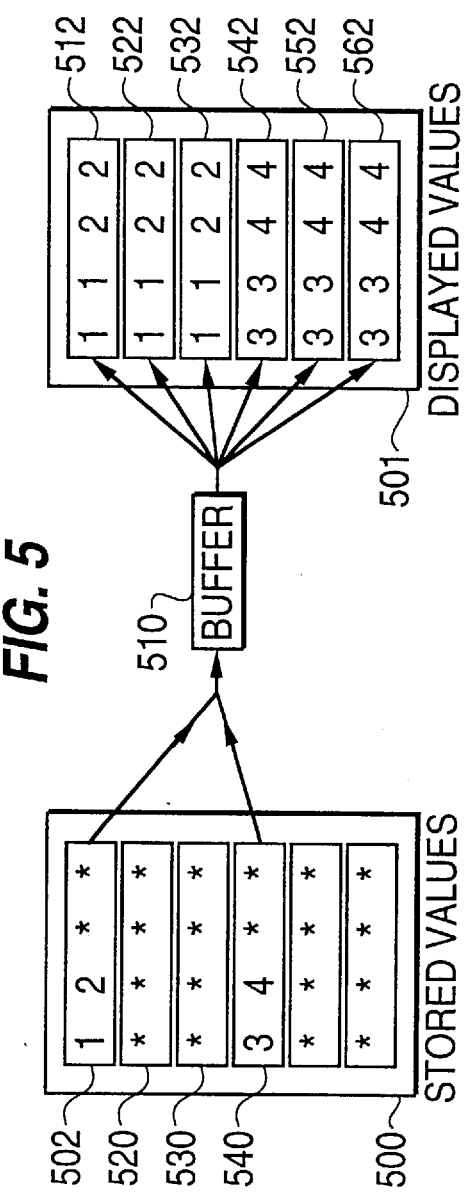

FILTER RAMDAC WITH HARDWARE 1½-D ZOOM FUNCTION

This application is a continuation of application Ser. No. 08/177,569, filed Jan. 4, 1994 now abandoned.

BACKGROUND OF THE INVENTION

1. Field of the Invention

The present application discloses a method and an apparatus for expanding the size of an electronic image while maintaining image quality, and more particularly, is directed to a RAMDAC having a zoom and a filter function to disperse and filter pixels to generate enlarged images on computer displays from stored movies and still pictures, or the like.

2. Discussion of Related Art

Presently there is a substantial interest in showing images, both still and moving, on desktop computers. Example applications include video conference calls and mixed media programs such as Windows™ compatible programs. Conventional systems are incapable of easily displaying full color and full motion at full screen resolutions simultaneously due to the large amount of data involved in generating an image and limitations on hardware, such as memory size or speed. In these conventional systems, a tradeoff between image size, frame speed and quality is made. To gain sufficient speed, this tradeoff often results in an image that is smaller than desirable. The rapid display of pictures requires more software and hardware capacity than is desirable, thus making a tradeoff between image size and quality desirable. To compensate, a small original image can be enlarged during playback. This process is referred to as "zooming".

The simplest and most often used method for enlarging an image composed of pixels (picture elements) is through pixel replication. This process, as illustrated in FIG. 1, involves replicating an original pixel. Specifically, for example, each pixel in an original image 102 are replicated six times to make a 3×2 enlargement 104, which can be identified by the scale factors $A_X=3$ and $B_Y=2$. The scale factors $A_X$ and $B_Y$ can be fractional. For purposes of illustration, the nine pixels are shown with pixel values 1–9. In pixel replication, a pixel 106 having a pixel value 7 is copied into six pixels 111–116, all retaining the original pixel value 7, for example. The pixel replication enlargement technique is very fast to compute and can be performed in software or can be easily implemented in hardware. The price of the simplicity is an image composed of blocks of pixels having the same pixel value which results in an undesirable mosaic effect. This creates artifacts such as a staircase effect on diagonal edges in the image.

A better image can be obtained by applying filtering to the expansion process. This process is shown in FIGS. 2A–2C. The original image 202 (FIG. 2A) is expanded in a first step to an enlarged image 204 (FIG. 2B) by spacing out the values in the same pattern as is done in simple pixel replication, above. However, unlike pixel replication, in a digital filtering technique the values of pixels interspersed between the original pixels are initially made arbitrary in a second step, as indicated by the blank pixels in image 204. In a third step, the blank pixels are filled in with mathematically created (interpolated) values, indicated by the asterisks ("*") shown in the intermediate enlarged image 206 (FIG. 2C).

Algorithms for computing the values for the interspersed pixels are well known and generally involves the equivalent of a digital low-pass filter of some kind. The simplest filter, although not the best in terms of resulting image quality, is a linear interpolator which averages surrounding pixel values to estimate the pixel value of any given interspersed pixel. For example, in FIG. 2C an interspersed pixel 210 would have a weighted average of the pixels stored in the closest adjacent original pixels 212, 214, 216 and 218. Since the interspersed pixel 210 is closest to first original pixel 212 in FIG. 2C, the color value of the first original pixel 212 would be given more weight. Once again, there are many algorithms for weighting neighbors (linear, gaussian, inverse square, etc.).

These expansion and filtering operations can be performed in several different places in the system, each with advantages and disadvantages. FIG. 3 shows a typical video subsystem. Video signals of an image are either created or retrieved by software running in a CPU 302. The video signals are output from the CPU 302 and are transmitted via an I/O bus 304 to a graphics controller 306. The graphics controller 306 processes the data, if required, and transfers the data over a two way buffer memory interface 305 for storage of the results in a frame buffer 308. This is referred to as the "drawing process".

The frame buffer 308 can store sufficient data to display a complete screen on the monitor and permits the CPU 302 and the graphics controller 306 to operate at speeds other than a video rate.

A "display process" simultaneously occurs with the drawing process. In the display process, the contents of the frame buffer 308 are repeatedly read by the graphics controller 306 over a refresh interface 307, and repeatedly transferred over a pixel stream interface 310 through a RAMDAC 309 to a CRT monitor 314 over an analog video signal interface 313 to redraw (refresh) the screen at a video rate. The screen is typically refreshed between thirty and eighty times per second.

During the display process, image data transfer from the frame buffer 308 is initiated by the graphics controller 306 and sent to the RAMDAC 309. The RAMDAC 309 contains a color map, or color look-up table, in RAM where color codes are translated into red, green and blue digital quantities. The DAC generates a video waveform for each of red, green and blue for display on the CRT monitor 314. Depending on the system, the image data may go through the graphics controller 306 via a connection 310 or directly from the frame buffer 308 to the RAMDAC 309 via another connection 312.

For image expansion, the most common current implementation is to perform zooming in software by the host CPU 302 before the image is transferred to the screen memory frame buffer 308. In systems in which the CPU 302 performs the zoom function, a substantial portion of the CPU cycles as well as cycles of CPU-to-graphics controller interface 304 and frame buffer memory interface 305 (because full size images are moved at a frame rate) are consumed.

Alternatively, as envisioned by the present inventor, to unload the image enlargement task from the CPU 302, an intelligent graphics controller 306 can expand the image as it moves it into the frame buffer 308. This is predicted to be a favored technique in upcoming hardware generations. Under this scenario, software in the CPU 302 would send a small image to the graphics controller 306 with instructions on how big the image is to be. Digital firmware or hardware in graphics controller 306 would perform the expansion and store the enlarged result in the frame buffer 308. For simplicity, the image expansion would be typically performed using a pixel replication technique. It is predicted by the present inventor that in the future more sophisticated graphics controllers are likely to add filtering to their conventional function. However, in addition to the large increase in hardware, the filtering would slow the drawing speed, thus reducing the desirability of such a system.

Whether filtering is done in the CPU 302 or the graphics controller 306, a full-size image is stored in the frame buffer 308 and no image processing is done in the refresh path 307 from the frame buffer 308 to the CRT monitor 314. Because filtering typically is not practical in current processors, the processors perform simple pixel replication.

Also, if the graphics controller 306 performs the zooming operation, the CPU 302 and an CPU-to-graphics controller interface 304 are freed from moving these large images, which is a real benefit, but the buffer memory interface 305 is still heavily occupied by the large volume of image data. Further, although the CPU and frame buffer memory interface 305 and refresh interface 307 may be dedicated (as shown in FIG. 3), if the frame buffer 308 is composed of expensive V-RAM (Video-RAM), or if the frame buffer 308 is composed of common DRAM (Dynamic RAM) (the choice of specific memory type depending on factors outside the scope of the present specification), the two data streams share the same physical memory interface, resulting in much lower bandwidth available for storing images. In such a case, after allowance for the requirements of refresh interface 307, there is often insufficient available bandwidth for transferring the large images over the buffer memory interface 305. Further, even if there is sufficient bandwidth for both refresh and initial storage of the images, the computer user is likely to desire other computer operations simultaneously with the video display. The high consumption of bandwidth over the buffer memory interface 305 may result in a sluggish and unacceptable performance in the display of these other desired operations.

Another problem with the above discussed systems involves palette colors. If the screen image is stored as, e.g., 8-bits per pixel or less, the colors to be displayed are not usually stored in a screen memory 308. Instead, a color number (a.k.a. palette index) is stored. This color number refers to the contents of the color look-up table stored in the RAMDAC 309, which converts the number to colors during the display process. This presents two problems for the graphics controller 306. First, since the graphics controller 306 does not have direct access to the look-up table in the RAMDAC 309, it cannot determine the color of the neighboring pixels. Instead, the graphics controller 306 only knows the color numbers, which are arbitrarily assigned. This problem could be overcome by providing a duplicate RAM within the graphics controller 306, but this approach would add considerably to the cost of such a system, which makes filtering in the graphics controller 306 less desirable.

Yet another problem is that, even if the graphics controller 306 evaluates the colors and calculates the desired blended color for a generated pixel, it must store the result back into the frame buffer 308 as the color number (palette index). Typically, the exact desired value would not be found in the palette. Palettes usually store only 256 colors from a range of approximately 16 million colors. This means that the hardware would have the formidable task of having to choose the closest match and therefore this system is problematic.

SUMMARY OF THE INVENTION

The present invention overcomes these problems by adding filter and/or zoom logic to the data stream of a RAM-DAC. This results in several advantages such as the filter RAMDAC not affecting the speed of the system, since the filter RAMDAC does not participate in the drawing process. Instead, the filter RAMDAC operates at video rates during the display process.

Also, the filter RAMDAC can control the quality of images expanded by current and future envisioned software and hardware.

Additionally, images can be stored in the frame buffer in common graphics formats including color palette format.

Further, the filter and zoom functions of the RAMDAC can be enabled or disabled for regressive compatibility with existing RAMDAC's with respect to form and function.

The present invention includes a RAMDAC unit for converting graphics data into analog display signals and having a filter for generating graphics data in the spaces interspersed between the pre-existing graphics data created during image enlargement, thus relieving an central processing unit and/or graphics controller of this function.

The invention addresses difficulties in displaying still pictures and, more particularly, full motion video in a computer display by overcoming problems associated with insufficient bandwidth in current personal computer systems and graphic subsystems by zooming images in hardware at the RAMDAC.

The present invention also conserves CPU cycles and interface cycles (or bandwidth) by performing the zoom in hardware, and further conserves frame buffer memory interface cycles by performing the zoom in the refresh cycle, between the refresh interface and the CRT, specifically, either in the graphics controller or the RAMDAC.

Further, in an embodiment having the inventive RAMDAC with filter and novel zoom function, a synergistic effect is achieved through shared hardware and software operations, thus resulting in a system where, by the cooperative efforts of the distinct filtering and zoom functions, the above-mentioned problems are greatly ameliorated.

By including logic in the filter that can track the zoom logic calculation and predict where the original pixels will be stored and where the interspersed pixels (whose values are to be determined) will be stored, the filter can calculate purely from the original pixels and ignore the interspersed pixels. By implementing such a tracking filter, the contents of the interspersed pixels become inconsequential and can contain any value, even replication values. Because replicated pixels do not interfere with the filter function, the filter can follow and operate on the output of standard hardware or software zoom functions which replicate pixels.

BRIEF DESCRIPTION OF THE DRAWINGS

The present invention will now be described in more detail with reference to embodiments of the invention described below, given only by way of example, and with reference to the accompanying drawing figures in which like elements are given like reference numbers and wherein:

FIG. 1 illustrates image expansion through simple pixel replication;

FIG. 2A–2C illustrate filtering of pixel data during image expansion using weighted pixel values;

FIG. 4 illustrates horizontal zoom using a conventional one-line buffer;

FIG. 5 illustrates horizontal and vertical zoom using a one-line buffer in accordance with the present invention;

DETAILED DESCRIPTION

Figure 3:
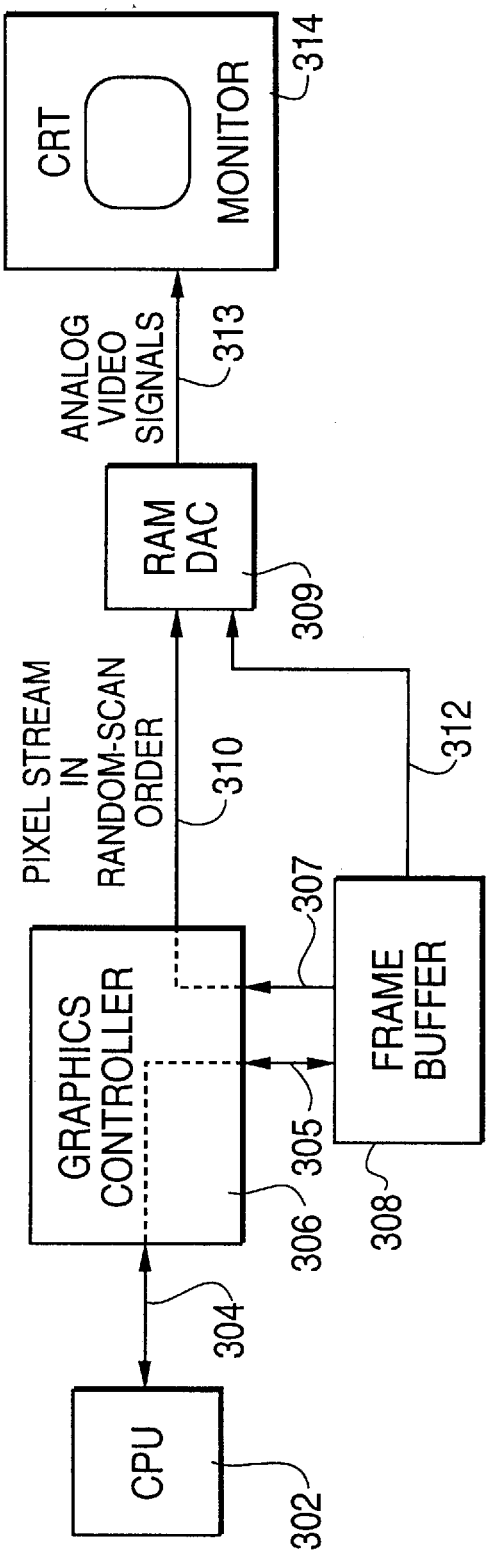
FIG. 3 is a functional block diagram of a conventional video subsystem in which the present invention can be used.

To facilitate an understanding of the disclosed embodiments in accordance with the present invention, the pixel data manipulation during the zoom operation will be described first in abstract terms, and then the hardware and software will be described for zoom operations, then for filter operations, and finally for combined zoom and filtering operations in the RAMDAC.

To relieve the CPU 302 and the CPU-to-graphics controller interface 304 from severe bandwidth requirements, a one-line buffer or the software equivalent is used to stretch data in the horizontal dimension. As shown in FIG. 4, each line of an original ("1 2" and "3 4") are initially replicated vertically, e.g., in the CPU 302, to form an intermediate zoom image 401, but not replicated horizontally. In this example, each line is replicated three times when transferred from the CPU 302 to the frame buffer 308. This replication could be done by the CPU software or the graphics controller 306, but preferably by CPU software. Thus, original data "1 2" of line segment 402 becomes three line segments 402, 404 and 406 in the intermediate image 401. Likewise, the second line "3 4" becomes a second three line segments 440, 450 and 460 of the intermediate, stored values 401. One copy of the data pixels "1 2" and "3 4" are stored in each line.

Since the remainder of the frame buffer pixels (which will be over-written by the zoomed image) will not influence the output display, they can have any contents and be ignored by the drawing software. These non-displayed frame buffer locations are indicated with an asterisk ("*") in FIG. 4.

In operation, the intermediate line segments 402, 404, 406, 440, 450 and 460 (these are subsets of the entire horizontal data stream for one line) would be loaded into a line buffer 410 as the raster scan progressed. The first line 402 is passed into the line buffer 410 in step 408a, and replicated the proper number of times to create pixels 413, 414, 416 and 418 of displayed image line 412.

Likewise, on the next raster scan line, the next line segment 404 would be loaded in a step 408b into the line buffer 410 and used to create the next expanded line segment 422. This process would be repeated through steps 408c–408f for the remaining lines 406, 440, 450 and 460 to create the rest of the displayed line segments 432, 442, 452 and 462, respectively. This type of use of a horizontal line buffer 410 can be found in current technology. This reduces the burden on the CPU 302 from that of writing the entire zoomed image (twenty-four output pixels in this example) to inputting the original image a number times equal to the vertical scale pixels (4·3=12, in this example).

Since contents of the second line segment 404 is the same as that of the first line segment 402, if the line buffer 410 is not loaded with the second line segment 404, it will still contain the proper contents ("1 2") to generate the corresponding displayed line 422. The ramification of this is illustrated in FIG. 5, which illustrates a general concept of the present invention.

In the left area of FIG. 5 is the vertically stretched image 500, similar to that of FIG. 4. Unlike FIG. 4, however, the only the entries of the first and fourth lines 502 and 540 have values stored; the others are left with unchanged and unimportant contents, labeled with asterisks "*" in FIG. 5. To fill this table, the CPU 302 stores only one copy of the original pixels "1, 2, 3, and 4", albeit spaced vertically. The original pixels are spaced vertically in the same pattern as the first lines containing unique copies of data in FIG. 4.

A single line buffer 510 is only loaded with scan lines which have original data 502 and 540. On other lines (those marked with "* * * *" in FIG. 5), the single line buffer 510 is not loaded; instead, the previous, still valid contents are reused. For instance, the line buffer 510 is loaded from the first line segment 502 and used to create the zoomed line 512 to be displayed. On the second line segment 520, the loading of the line buffer 510 is suppressed and the old contents "1 2" are again used to generate the next line 522 to be displayed. Similarly, a third line 532 to be displayed is also created with the unchanged line buffer contents "1 2".

When the fourth line segment 540 is used, the single line buffer 510 is enabled and loaded with the new data "3 4". The zoomed lines 542, 552 and 562 are created with the data "3 4", now loaded into the single line buffer 510.

It is important to note that for optimal operation, this system should be able to determine where original data is located. It is to load all original data and no meaningless data "*" into the single line buffer 510 in order to operate optimally. This requires coordination between the CPU software which fills the vertically spaced buffer 500, and the hardware which creates the zoomed image 501. It is because the software cooperates and performs part of the operation that it is referred to as a "Hardware 1½-D Zoom" instead of a "Hardware 2-D Zoom".

Figure 6:
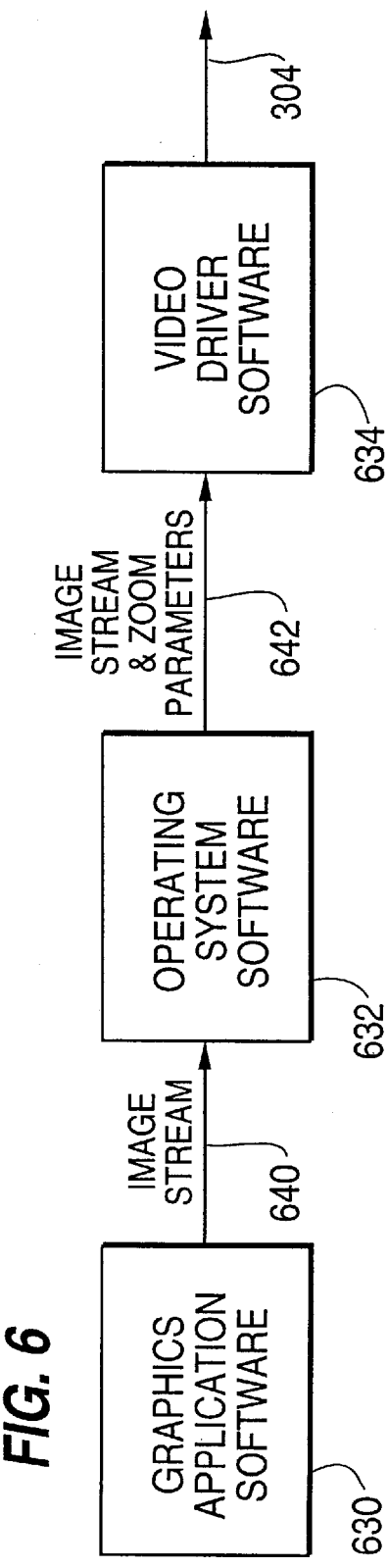
FIG. 6 is an expanded illustration of software in the CPU shown in FIG. 3.

To help explain the coordination between the CPU software and the hardware, reference is made to the expanded CPU 602 view shown in FIG. 6, in which three software components are shown. Graphics application software 630 (e.g., Windows Media Players) creates or retrieves the desired image and sends it to operating system software 632 (e.g., Video for Windows™), as an image data stream 640. The operating system software 632 coordinates the image with any other screen items (e.g., overlapping windows, etc.) and adds size and position information. This image data stream with zoom and position parameters 642 is passed from the operating system software 632 to video driver software 634. These software components are generally known to people skilled in the art.

The video driver software 634 is specific to the installed display hardware. If the display hardware has built-in capabilities, the video driver software 634 will format the request in the proper form and pass it to the display hardware to perform the display function. If the display hardware does not have built-in capabilities for the requested operation, the video driver software 634 will perform operations in software and pass lower-complexity display requests to the display hardware. A typical low level request is "store a pixel", thus the video driver software 634 can do all computations and reduce the operation to a trivial memory store instruction for instance.

It should be noted that the video driver software 634 can perform all or part of an operation in conjunction with the capabilities of the video display hardware. This interaction is completely hidden from the operating system software 632 and the graphics application software 630; they only receive an affirmative response to their display request.

In a preferred embodiment, the video driver software 634 would store an image in the spread format 500 shown in FIG. 5 and pass the necessary (size and position data) information to the RAMDAC 309 to fill the data and display the zoomed image 501. Thus, only one copy of the image data is written over CPU-to-graphics controller interface 304 and the frame buffer interface 305.

It is important to note that the graphics application software 630 can also read the screen image. The video driver software 634 must note the zoom area and specially treat any requested read operations of this area. If a read operation is requested, the video driver software 634 must recreate the missing "*" data before responding to the request. Although it will produce a small delay, this can be performed in software since all necessary data is still available, the data being stored (in the spread format) in the buffer image 500 shown in FIG. 5.

Figure 7:
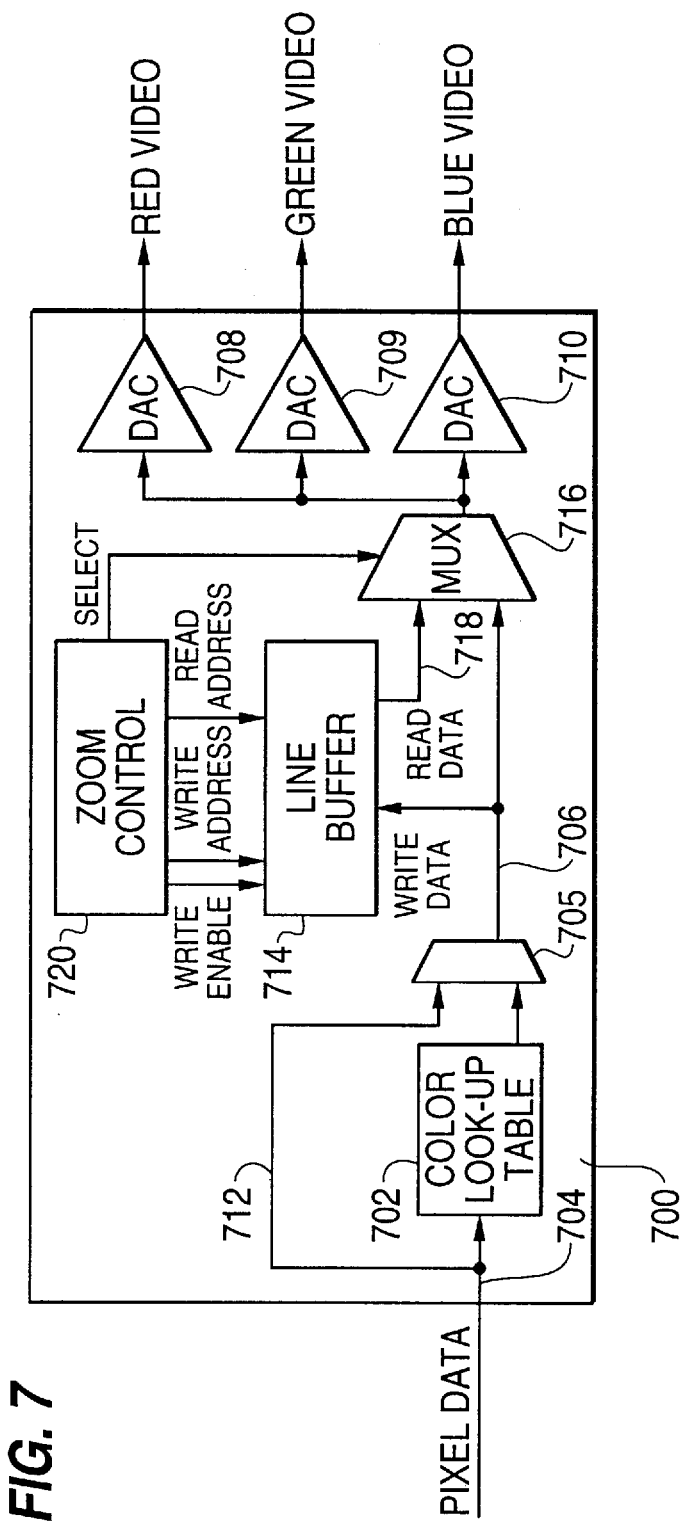
FIG. 7 is a function block diagram of a line store and zoom control in a zoom RAMDAC in accordance with the present invention.

To turn this stored data 500 into the desired format, the RAMDAC 309 must have enhanced circuitry. In accordance with the preferred embodiments, an enhanced zoom RAMDAC 700 is provided, as shown in FIG. 7. Like a conventional RAMDAC 309, there is a color look-up table 702 which converts the incoming pixel color numbers 704 to the desired RGB color values 706 which are then converted to analog video signals by the DACs 708, 709 and 710, one DAC for each primary color. A bypass path 712 allows images stored in RGB format to directly drive the DACs 708, 709 and 710, without translation by the color look-up table 702. A multiplexer 705 selects which path is used. These features are common in current RAMDACs.

The present embodiment adds a line buffer 714 to store one original data line segment (502 or 540 in FIG. 5), a multiplexer (MUX) 716 to switch between the normal color data 706 and the line buffer data 718 and zoom control circuitry 720 which generates write and read address and control (write enable and select) signals for the line buffer 714 and the multiplexer 716. Other than the dual-port ability to write and read, the line buffer 714 is of a conventional structure. The line buffer 714 performs the functions described with reference to the buffer 510 of FIG. 5.

Figure 8:
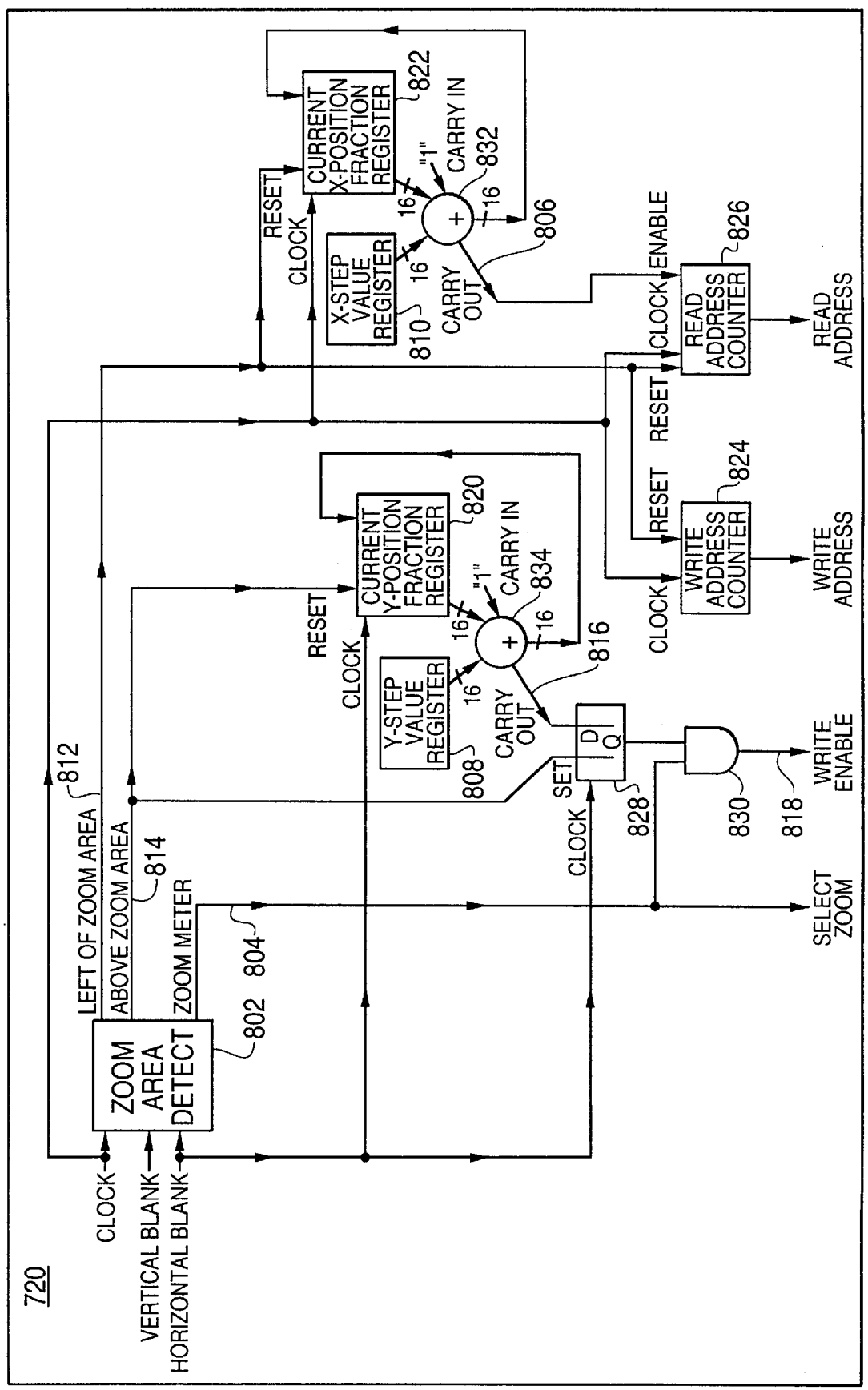
FIG. 8 is a functional diagram of the zoom control logic of the zoom RAMDAC shown in FIG. 7 in accordance with the present invention.

The logic of the zoom control 720 is detailed in FIG. 8. The first job of the zoom control logic is to count clocks pulses to keep track of where on the video screen data will go. A zoom area detector 802 counts the clocks pulses and monitors horizontal and vertical blank signals to determine the current position of the raster scan. The function is achieved by a simple set of counters and comparators which determine when the raster is above, to the left of, and within the zoom area. The zoom area is defined as the zoom result (enlarged) area, not the small source area, for purposes of explanation.

In operation, the zoom area detector 802 has stored within it constants indicating the start and end coordinates of the screen zoom area (upper-left corner and lower right corners). These constants are supplied by the matching video driver software 634 shown in FIG. 6 and described above.

In addition to coordinates that identify where the zoom area is, there are facilities for one or more sets of coordinates that identify where the zoom should not be performed (excluded). These "exclude" areas allow for interruption of the video area by such temporary screen items as cursors or pull-down menus. In a preferred embodiment, there is allowance for one rectangular exclude box specified by X and Y values for the start and stop points (upper left and lower right corners, respectively).

Whenever the zoom area detector 802 detects that the current screen position (X and Y) is within one or more exclude areas, a zoom-now signal 804 is removed even if the raster is within the zoom area.

In addition to providing the current X, Y raster position, the horizontal blank signal forces the assertion of a left-of-zoom-area signal 812 and the vertical blank signal forces the assertion of an above-zoom-area signal 814. This assures proper zoom control 720 initialization even if the zoom area includes the top line or left edge of the screen areas, as further explained below.

There are two other constants loaded by the software video driver 634; a Y-step value 808 and an X-step value 810. The X-step value 810 allows the hardware to exactly place copies of the zoomed data and the Y-step value 808 allows the hardware to predict which lines have unique data and which have unwritten "*".

The Y-and X-step values 808 and 810 are the inverse of the zoom ratio scale factors $A_X$ and $B_Y$. For example, if the scale factor $A_X$ is 2 (the result is to be twice the width of the original), the inverse of the ratio is a X-step of 0.5. In a preferred embodiment, the value would be a 16 bit fixed value where the largest value (FFFF (hex)) would be the fraction closest to 1 (65535/65536). Our example value of 0.5 would be stored as 8000 (hex). The software would not request the hardware to assist for zoom ratios of 1.0 or lower (shrink an image) so the hardware does not need to store ratio values of 1.0 or larger.

To describe the operation of the zoom control 720, the process will be described as the raster starts at the top, left corner and proceeds left to right, and down, line-by-line. As the scan starts, the left-of-zoom-area signal 812 and above-zoom-area signal 814 are generated.

The above-zoom area signal 814 will keep a current Y-position fraction register 820 reset until the scan line containing the first (topmost) line of the zoom area appears. Similarly, the left-of-zoom area signal 812 will reset the current X-position fraction register 822 until the left edge of the zoom area is reached. Also reset by the left-of-zoom-area signal 812 are the two counters that control a write address 824 and read address 826 for the line buffer 714. Thus, writing and reading operations will begin together at the start of the line buffer 714 at the left edge of the zoom area. Although the addresses start together, they do not stay together; the write operation occurs on every pixel and the read operation advances slower. The read operation rate is determined by the contents of the X-step value register 810 as will be shown.

As the top left edge of the zoom area is reached, both the left-of-zoom-area signal 812 and above-zoom-area signal 814 will become false. This removes the reset on the current Y-position fraction register 820 and on the current X-position fraction register 822. The zoom-now signal 804 will be asserted since the raster is now in the zoom area and, combined with the preset output of flip-flop 828 and AND gate 830, generates a write enable signal 818. The line buffer 714 will now store every pixel value, as described with reference to FIG. 5. As pixel values are clocked into the zoom RAMDAC 700, the write address counter 824 will be incremented and advance the address in the line buffer 714 into which the pixels are being written. In this way, the source or original pixels are stored.

Since the zoom area (enlarged destination area) may be wider than the largest original line that the line buffer 714 can store, the write address counter 824 stops counting when it reaches the value of the largest valid line buffer address. This can be accomplished by many conventional counter design techniques. Alternately, to keep the line buffer 714 contents from being corrupted, the write enable signal 818 could be gated off when the counter exceeds a maximum address.

The zoom-now signal 804 is identical to the multiplexer select signal, such that whenever the raster is within the zoom area (and not in an excluded area), the multiplexer 716 is switched to output the line buffer read data 718. At all other times, the multiplexer 716 is switched to output the original RAMDAC data 706 (which is not in the zoom area).

The data which is read from the line buffer 714 for each pixel of the zoom area is selected by the read address counter 826. This read address counter 826 advances only when an X-step adder 832 overflows and creates a "carry" output. Thus, the original pixel values are repeatedly read out, as described with reference to FIG. 5, until the X-step adder 832 overflows, which means the position for the next set of original data is reached. How the RAMDAC control 720 determines when the next set of original data is due is explained as follows.

The X-step adder 832 adds an X-step value 810 to the previous sum stored in the current X-position fraction register 822. Since the X-step value is the inverse of the X-zoom ratio, this adder 832 will overflow after repeating a number of pixels equal to the zoom ratio. For the zoom in FIG. 1, the X-step value would be ⅓, causing the integer portion to change every 3 pixels. This causes the pixels to be replicated 3 times. If the increment were a little larger, the accumulator may change every 2.5 pixels, resulting in a pixel replication pattern of "111223334455566..." The "1" always input to the X-step adder 832 as carry-in into every addition cycle biases the process toward generating a carry-out and compensates for the rounding down (truncation) normally performed by the integer math that generates the X-step value.

More precisely, in an example where the horizontal zoom ratio $A_X$ was 2, the 16-bit X-step would be 8000 (hex). Starting with a current X-position fraction of 0000 (which was reset by left-of-zoom-area signal 812), the output of the adder 832 during the pixel on the left edge of the zoom area would have the sum of 8000+0000+1=8001 with no carry-out.

Because there was no carry-out during the first pixel, the read address 826 counter would not advance and the read address would remain at 0000 for the second pixel. This would cause the first pixel "1" (stored in line buffer 714 location 0000) to be read and displayed again (replicated).

The second addition (8001+8000+1=10002) results in a 16-bit result of 0002 plus a carry-out 806. The carry-out 806 would enable the read address counter 826 to count after the second pixel, incrementing the line buffer address to 0001 for the third display pixel. The value in line buffer location 0001 is the second input pixel "2" which would be displayed in this third output pixel position.

This pattern of add and carry repeats, causing each input pixel to be displayed twice as the read address counter 826 only advances on every second pixel clock pulse, when the X-zoom ratio $A_X$ is 2.

Similarly, the current Y-position fraction register 820, Y-step value register 808 and adder 834 work to generate carry-out signal 816 and the write enable signal 818 every $B_Y$ lines, where $B_Y$ is the vertical zoom ratio.

The sequence to generate the write enable signal 818 proceeds as follows. When the raster scan reaches the first (top) scan line of the zoom area, the above-zoom-area signal 814 is removed, thus removing the reset signal from current Y-position fraction register 820. Each subsequent raster scan line adds the Y-step value to the contents of the current Y-position fraction register 820. On lines where a carry-out 816 is generated, the carry-out 816 is clocked into the flip-flop 828 to assert the write enable signal 818 and store data in the line buffer 714 on the following scan line.

In the example where the vertical zoom factor $B_Y$ is 3, as in FIGS. 4 and 5, the Y-step value 808 would be ⅓=5555 (hex). At the end of the first line of the zoom area, the horizontal blank signal would clock the current Y-position fraction register 820 with the new sum 1+0000+5555=5556 and also clock the carry-out 816 ("0") into flip-flop 828. Since there was no carry-out 816, the write enable 818 would not be asserted so no data from the second line of the zoom area would be written into the line buffer 714. This is equivalent to ignoring pixels 520 of FIG. 5. Instead the contents of the line buffer 714 would be re-used as the read address counter 826 increments to read the contents (2 times each) out to the display DACs.

After the second line, the horizontal sync would again clock the sum (1+5556+5555=AAAC (hex)) into the current Y-position fraction register 820. Again, there is no carry-out 816 from this addition so another zero is clocked into flip-flop 828.

With a "zero" write enable value, the third line of data (line 430 of FIG. 5) would be ignored and the line buffer 714 contents would be re-used again. At the end of the third line, the horizontal blank signal would clock the sum (1+AAAC+5555=10002) 16-bit result of "0002" into register 820 and clock the "1" carry-out 816 into flip-flop 828. This "1" in flip-flop 828 would assert the write enable signal 818 for fourth line, causing the data of line 540 to be stored into the line buffer 714.

With this mechanism, the carry-out signal 816 will be asserted only before each line where data is stored, causing the line buffer 714 to be updated when there is new original image data and to retain data on lines where the data is unchanged.

One exception is addressed. Because the first line of the zoom area contains data, although there is no carry-out 816 yet, the write enable signal 818 should be asserted. To handle this exception, flip-flop 828 is preset by the above-zoom-area signal 814, to force a write enable signal 818 on this first line. On subsequent lines of the zoom area, the carry-out bit 816 will properly indicate which lines should be written.

One software complication can be avoided by handling the cursor in hardware. A cursor moving across the zoom area would require the zoom to be excluded from the horizontal lines where the cursor appears. To provide the proper image on these excluded lines, software would have to zoom the image and store the full volume of data in these lines. This is a bothersome, but not crippling task for the video driver software 634.

Figure 9:
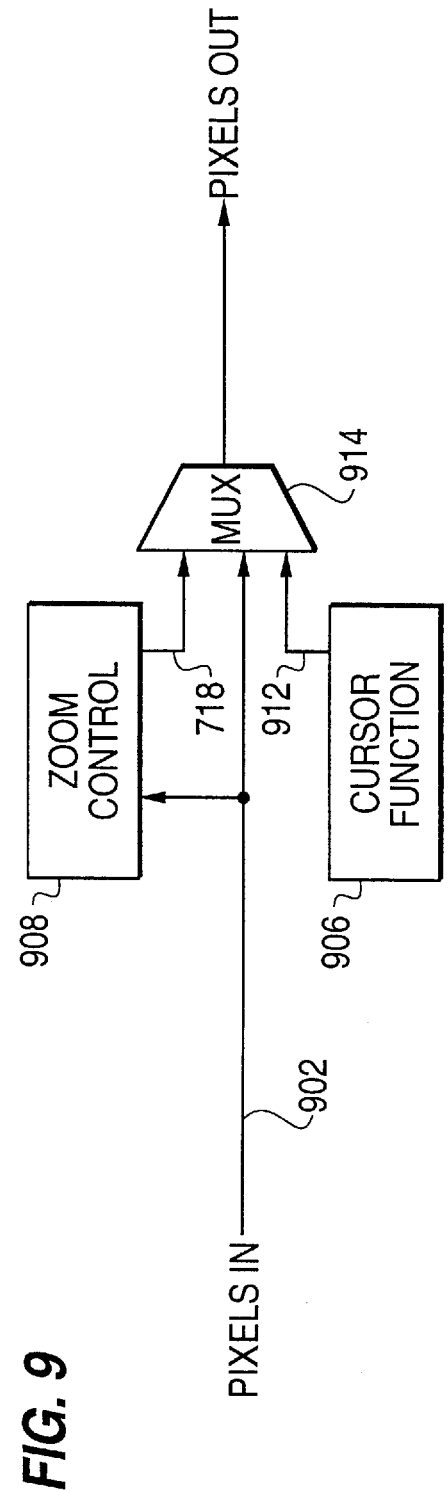
FIG. 9 is a functional block diagram of the novel zoom function with a cursor function.

To eliminate the conflicts between the zoom logic and cursor images, hardware cursor logic can be added as shown in FIG. 9. This cursor function 906 includes storage for the cursor image and positioning logic to determine when to display cursor and when to display image data. The output multiplexer 914 is expanded compared to the multiplexer 716 of FIG. 7 to switch between three data streams; the original image 706, the zoom data 718 and the cursor 912.

Since the cursor is now being handled in hardware, the cursor image will not be stored in the frame buffer 714 and will not corrupt the data in the zoom area. The zoom function 908 (zoom control 720 and line buffer 714 in FIG. 7) can be left enabled with no exclude area (at least no exclude area due to the cursor).

During the cursor time, the zoom function 908 can continue to fill the line buffer 714, and in fact, continue to generate outputs to the multiplexer 914. The selection of cursor data as the output does not affect the internal workings of the zoom function 908. After the raster moves past the cursor position, the multiplexer 914 can switch back to the zoom data stream 718, this data stream being intact and correct. The selection of the cursor function overrules the selection of the pixels in or zoom function, the selection mechanism being implemented through two cascaded multiplexers, for example.

Although the preferred embodiment described here is for a RAMDAC implementation, as can be seen from FIG. 3, the zoom function could also be placed in the refresh path 307 of the graphics controller 306. The logic to perform the function would be virtually identical to that shown in the RAMDAC implementation at FIG. 9, including a line buffer 714, multiplexer 914 and equivalent zoom control 720.

Placement of the cursor function logic in the graphics controller 306 has some advantages and some disadvantages over the RAMDAC implementation shown in FIG. 9. Many D-RAM based graphics controllers already include special hardware to manage the cursor image. Although the cursor could be added to the RAMDAC, the graphics controllers typically use spare frame buffer D-RAM to store the cursor image with no incremental memory cost. The RAMDAC would have to add this cursor image memory, and memory is expensive in terms of gates and power consumption.

Likewise, the RAMDAC embodiment of FIG. 7 has an advantage over the graphics controller embodiment in the implementation of the line buffer 714. The dual-ported line buffer 714 requires too fast an access to permit the graphics controller 306 to use frame buffer D-RAM. A new RAM must be added, either inside the graphics controller chip or as an external integrated circuit (IC). External ICs add cost and require addition of precious interface pins, so an internal solution is preferred.

However, to enable quick design and time-to-market, the graphics controller 306 is usually implemented as a semi-custom gate array or standard cell. Fast dual-ported RAM required for the line buffer can be difficult to implement in these technologies. Adding the memory would require a major change in the whole design process.

It is much easier to add the line buffer 714 to the RAMDAC 700 than to the graphics controller 306. Because the RAMDAC 700 has both digital and analog functions, it is usually designed as a custom device. Adding a sophisticated RAM does not require a change of design methods, just circuitry. For this reason, the RAMDAC embodiment of FIG. 7 is the preferred embodiment.

Figure 10:
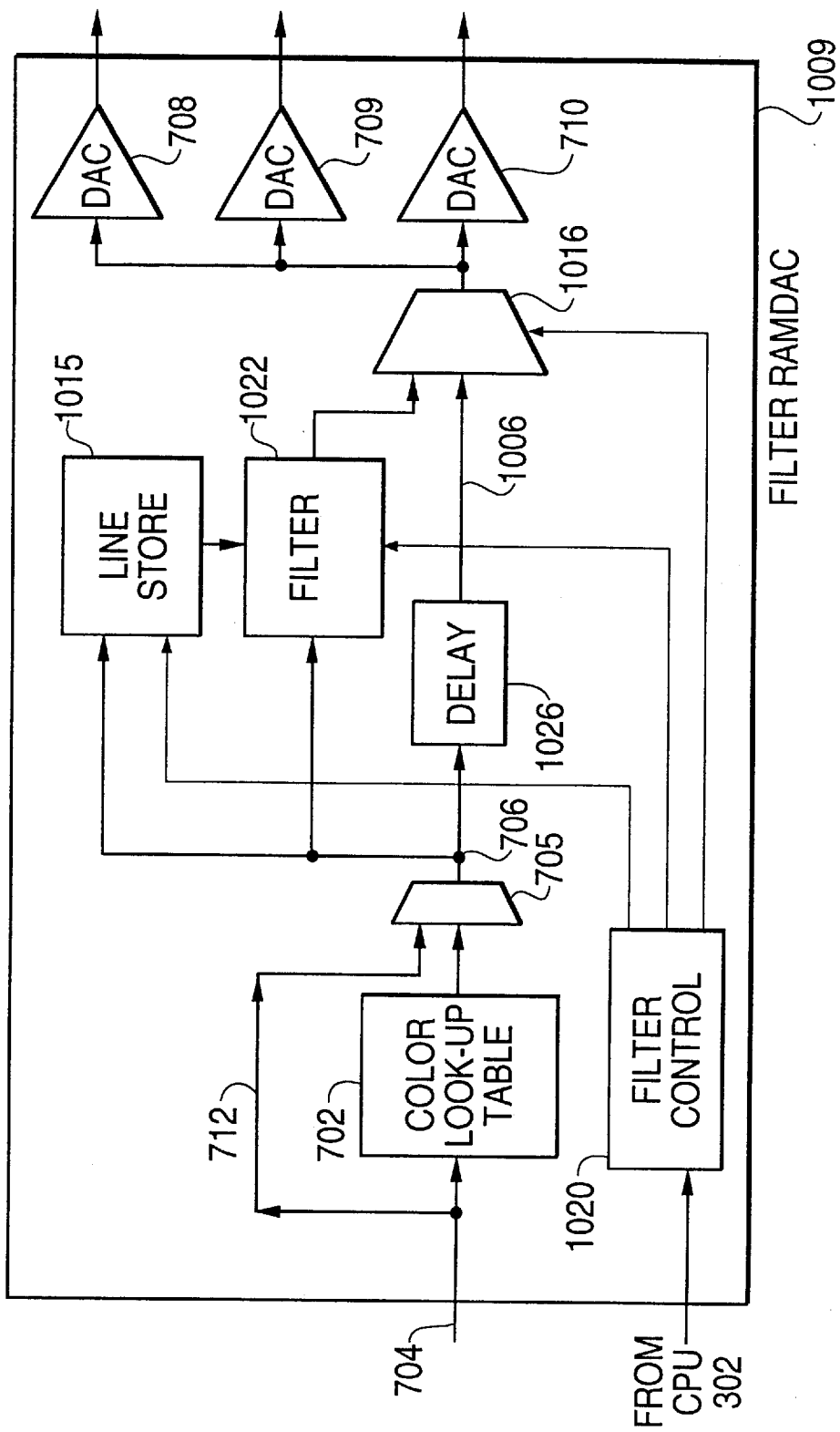
FIG. 10 is a functional block diagram of a filter RAMDAC in accordance with the present invention.

The present invention may also incorporate filtering logic to a RAMDAC subsystem as shown in FIG. 10. It is to be understood that the filter RAMDAC 1009 replaces the RAMDAC 309 of FIG. 3 for purposes of explaining this aspect of the present invention. In a compatibility mode, wherein the filtering function of the RAMDAC 1009 is disabled for compatibility with preexisting systems, computer data is input on lines 704 and translated into RGB (red, green, blue) values by a color look-up table 702 for display on a monitor 314 (FIG. 3), as discussed above. Where the data is already in RGB form (referred to as "true-color") and bypasses the look-up table as represented by line 712 in the filter RAMDAC 1009 shown in FIG. 10. The appropriate data stream is selected by a multiplexer 705.

The RGB values are passed through three DACs 708, 709 and 710, one DAC for each of the red, green and blue primary color images. The output of the DACs 708, 709 and 710 may be input to a CRT monitor 314 (FIG. 3).

When the filter of the RAMDAC 1009 is enabled, graphics display driver software 634 loads a control block 1020 with several constants. As with the zoom function, these constants include start and end coordinates (X, Y) for a rectangular correction area to be filtered as well as zoom ratio scale factors ($A_X$ and $B_Y$). If multiple video windows are to be filtered, then filtering for the entire screen could be enabled. This would, of course, filter and blur alpha-numeric computer data on the screen in absence of corrective measures (which could be incorporated). However, this mode may be desirable in such applications as video conferences where several simultaneous images are displayed, preferably with all the same zoom factors. In practice, storage and control for multiple independent filter windows is readily provided to thereby accommodate simultaneous display of several images with differing zoom factors.

To locate the correction area, the control logic 1020 counts lines from the top of the screen and counts pixels from the left edge to enable the filtering within the box described by the X and Y coordinates in much the same manner described above with reference to the zoom function as more fully explained with reference to FIG. 12.

In conventional systems other than the novel hardware 1½-D zoom described above, when the image is zoomed, the typical algorithm repeatedly adds an incremental value to the digital accumulator. The more significant bits of these numbers are considered integer and indicate whole pixel positions in the original image or the enlarged image. The less significant bits indicate fractional pixel positions. A typical sequence would involve the steps of (1) adding an incremental value to the accumulator; (2) outputting a pixel value addressed by the integer portion of the accumulator; and (3) back to step 1. For the zoom in FIG. 1, the increment would be ⅓, causing the integer portion to change every 3 pixels. This causes the pixels to be replicated 3 times. If the increment were a little larger, the accumulator may change every 2.5 pixels, resulting in a pixel replication pattern of "111223334455566 . . . "

For the filter RAMDAC 1009 to properly sort out the image values when expanded as explained immediately above, the control 1020 has the same values and uses the same counting scheme used to zoom the original image, whether the zoom is performed through software or hardware. Loading these values is the responsibility of a matching video driver software 634. The video driver software 634 detects a zooming command, places the zoom data into a software or hardware buffer, loads a correction area and increments values in the filter RAMDAC 1009, and enables the filter feature.

When the data stream enters the screen area to be filtered, the output of the color look-up table 702 (or, alternatively, the true-color bypass data) is channeled to a filter block 1022. The filter block 1022 can be of known design. These values are used, in conjunction with those stored in a line store 1015 to produce all the desired interspersed color values. These interspersed color values are output via an output data multiplexer 1016 and DACs 708, 709 and 710.

A delay element 1026 matches the delays required for the filter calculation to keep the filtered and non-filtered pixels (corresponding to non-zoomed display areas) synchronized at the DACs 708, 709 and 710. Depending on whether the filter 1022 is enabled, the data stream from the delay element 1026 and the filter 1022 are selected in blocks (according to the type of areas to be displayed, as controlled by control block 1020) by output data multiplexer 1016 prior to digital-to-analog conversion by DACs 708, 709 and 710.

As described, the preferred embodiment would implement a simple linear interpolation for deriving the interspersed pixel values. This would require the most closely adjacent original color values 212, 214, 216 and 218 shown in FIG. 2, for example, to act as the initial color values. The line store 1015 contains the previous line values 212 and 214 and the current data stream entering the filter 1022 would supply the current values 216 and 218 for the filter calculation. An alternative embodiment could contain more sophisticated filter kernels and store more lines to participate in the calculation.

The control logic 1020, by accumulating vertical increments, determines when the current line of pixels represents the last time before a change of values (i.e., newly presented original values) is to occur in a manner such as described with reference to FIG. 12. If the current line is a line with original values (e.g., line 512 of FIG. 5), it would load the line store 1015 with the original pixels in the input stream to preserve them for calculation of future lines.

Figure 11:
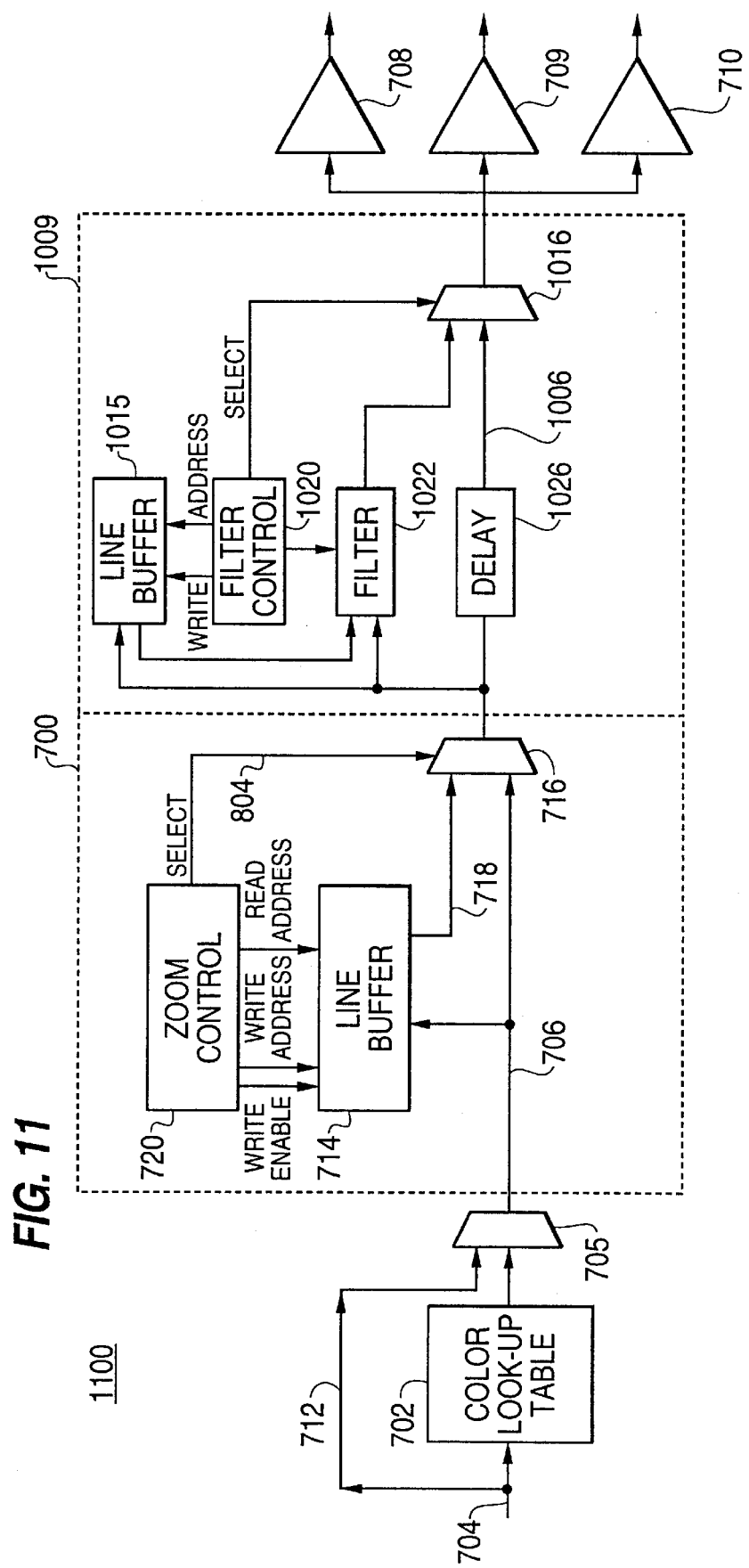
FIG. 11 is a function block diagram of a filter/zoom RAMDAC in accordance with the present invention.

FIG. 11 is an exemplary embodiment of the present invention wherein the filter function and the hardware 1½-D zoom function are operatively combined in a unique and advantageous fashion. As with the previous embodiments, the pixel data is input over pixel data line 704. This data is converted from palette index values into true color values by a color look-up table 702. If the pixel data is already in true color data form, bypass line 712 is selected by multiplexer 705. The color value data on line 706 is then input to the zoom function block 700. If the zoom function is not enabled, the line 706 acts as a bypass line by operation of the select signal 804. The zoom control 720 and line buffer 714 operate as described above with reference to FIGS. 5, 7 and 8. After zooming, the line store contains display values 501 as shown in FIG. 5. Once the data is zoomed (or after previously data has bypassed the zoom function 700), it is then filtered by filter 1022 in a manner described above in connection with FIGS. 10 and 12. Alternatively, delay 1026 and data line 1006 operate as a bypass for data which is not to be filtered in the RAMDAC 1100. The zoom control needs a small number of data values for zoom control, and the filter 1022 needs more data values so as to accurately produce the correct filtered pixel values. In improved action, the line store 714 of the zoom function is used to provide the current pixel data for the filter function, and line store 1015 provides the above-the-current-line pixel data used in the filtering process.

This unique configuration of zoom control 720, line store 714 and filter 1020 permits the sharing of hardware and software in providing zoom control and filtering functions simultaneously within the RAMDAC. The filtered and zoomed data is then output to the multiplexer 716 which, under the control of control unit 1020, selectively outputs either the original data or the filtered zoomed data to DACs 708, 709 and 710. The control 1012 also controls the operations of the filter 1022 and the line store 1015, as explained with reference to FIG. 10.

Figure 12:
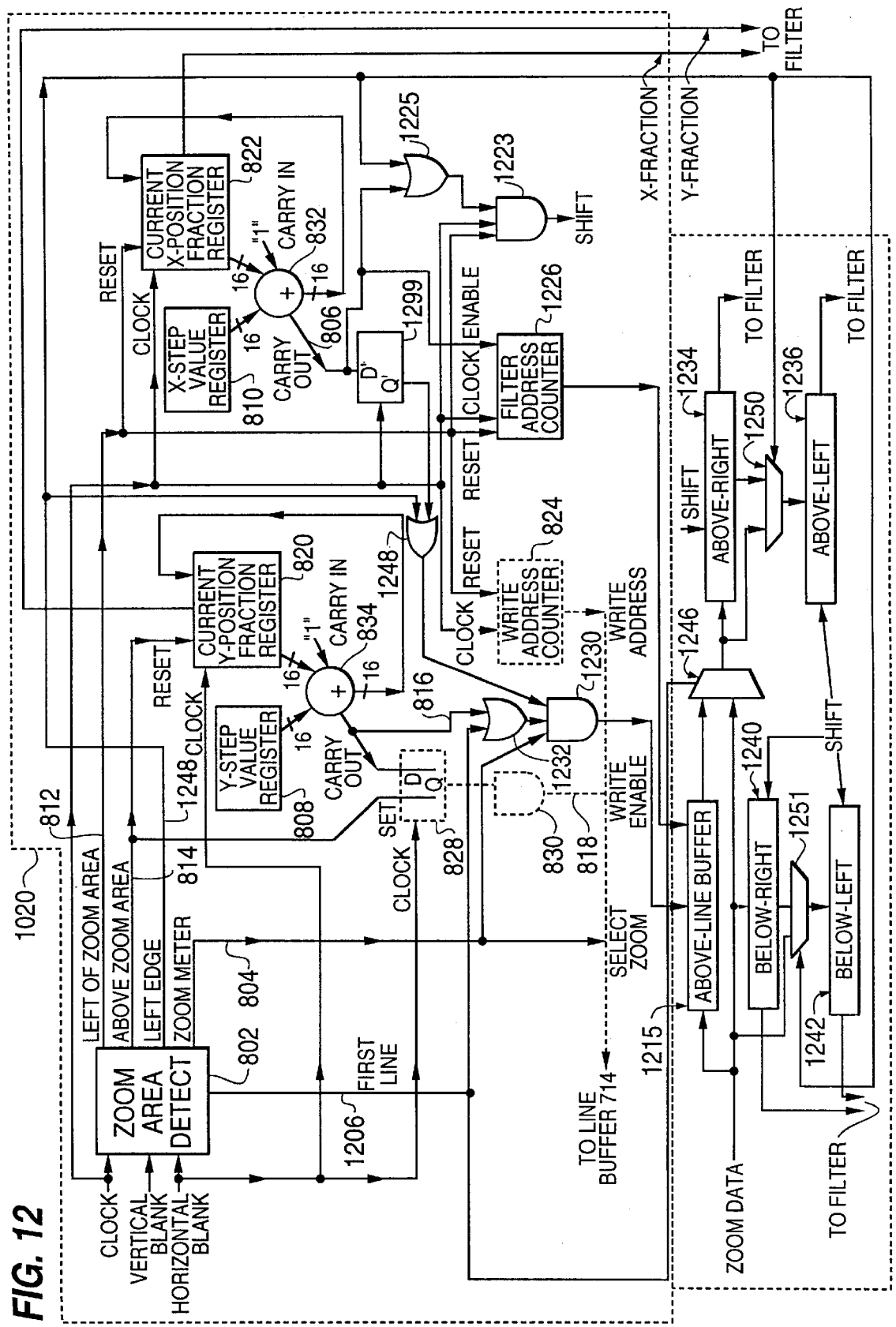
FIG. 12 is a functional diagram of the filter/zoom control logic of the filter/zoom RAMDAC shown in FIG. 11 in accordance with the present invention.

The logic of the filter control 1020 is detailed in FIG. 12 by the solid lines. When implementing the zoom/filter RAMDAC of FIG. 11, the logic shown in phantom are included.

In this embodiment, a 1×1 kernel linear interpolation of the pixel values is carried out. Thus, the filter control logic 1020 serves to identify the original pixel values and the distance (X-fraction and Y-fraction) the interspersed pixel (whose value is to be interpolated) is from four original pixels. It should be readily apparent that the filter control logic 1020 is substantially similar to the zoom control logic 720, and when both functions are implemented, they share much of the same hardware and software functions. Because of the similar operation of the circuit of FIG. 12 to the circuit of FIG. 8, like parts will bear like designations and some of the operational details will not be repeated here. The sharing of hardware and software not only assures a reduction in cost, in terms of both economic and power consumption, but also assures that the zoom and filter functions are coordinated in lock-step.

The zoom area detector 802 counts the clocks pulses and monitors horizontal and vertical blank signals to determine the current position of the raster scan. In operation, the zoom area detector 802 has stored within it constants indicating the start and end coordinates of the screen zoom area and exclude area (upper-left corner and lower right corners). These constants are supplied by the matching video driver software 634 shown in FIG. 6, as described above.

In addition to providing the current X, Y raster position, the horizontal blank signal forces the assertion of a left-of-zoom-area signal 816 and the vertical blank signal forces the assertion of an above-zoom-area signal 814. This assures proper filter control 1020 initialization even if the zoom area includes the top line or left edge of the screen areas, as further explained below.

There are two other constants loaded by the software video driver 634; a Y-step value 808 and an X-step value 810. The X-step value 810 allows the hardware to exactly predict or place copies of the zoomed data and the Y-step value 808 allows the hardware to predict which lines have unique data and which have unwritten data "*".

To describe the operation of the filter control 1020, the process will be described as the raster starts at the top, left corner and proceeds left to right, and down, line-by-line. As the scan starts, the left-of-zoom-area signal 812 and above-zoom-area signal 814 are generated by the zoom area detector 802.

The above-zoom area signal 814 will keep a current Y-position fraction register 820 reset until the scan line containing the first (topmost) line of the zoom area appears. A first-line-detect signal 1206 and left-edge signal 1248 are also generated by the zoom area detector 802. Similarly, the left-of-zoom area signal 812 will reset the current X-position fraction register 822 until the left edge of the zoom area is reached. Also reset by the left-of-zoom-area signal 812 are the two counters that control a write address counter 824 and address generator 1226 for the line-above-current-line buffer 1215. The write address counter 824 is used by the zoom function, but not the filter function. This buffer 1215 provides original image pixel values appearing in a line above the interspersed pixel, the value of which is to be calculated. The line buffer 714 of the zoom function 700 supplies the original image pixel values of the current line in a preferred embodiment. Between the two line buffers 714 and 1215, all the pixel value data necessary for determining the correct value of the interspersed pixel is provided.

As the top left edge of the zoom area is reached, both the left-of-zoom-area signal 812 and above-zoom-area signal 814 will become false. This removes the reset on the current Y-position fraction register 820 and the reset on the current X-position fraction register 822.

Two increment, add and storage units predict where original and replicated pixels will be stored. The horizontal unit is comprised of X-step value register 810, current X-position register 822 and adder 832. The vertical unit is comprised of Y-step register 808, current Y-position fraction register 820 and adder 834.

The two step fraction values in registers 808 and 810 are loaded by the matching software driver. Since the step values are the inverse of the zoom ratios ($A_X$ and $B_Y$), the adders will generate a true "1" carry output after repeating a number of cycles equal to the zoom ratio.

The X adder 832 will generate a carry signal when the coming pixel value will be the last pixel with the value of the coming pixel (i.e., the following pixel will be an original pixel). Likewise, Y adder 834 will generate a true carry signal with the current line is the last of lines when the current values (i.e., the next line will change and be new original data).

Since the filter requires the values of the line above for the calculation of the value of an interspersed pixel (when it is determined that the next line will have different pixel data), it must save the original image pixel values in the current line. This corresponds to when the Y adder has a carry and one clock pulse after the X adder has a carry. Accordingly, the X carry-out signal 806 is delayed one clock pulse by a flip-flop 1299, then passed through an AND logic gate 1230 with the Y carry-out 816. The resulting signal indicates when the above-line buffer 1215 should store the coming pixel.

An OR gate 1232 combines the first-line-detection signal with the Y carry signal 816 to force the first line of the image to be stored, even though the carry signal is not true.

Because the zoom function has a flip-flop 828 to delay the Y adder carry, the line buffer 714 associated with zoom will store pixels one line below that of the filter function line buffer (i.e., the filter line buffer 1215 stores the line before a new line containing original values, the zoom line buffer 714 stores the new line containing original values). This is what is desired since the filter must combine the values above with the current values (below).

Horizontally, both filter and zoom functions store the unique pixels on the first occurrence. The delay of a flip-flop 1299 in the filter is matched by the delay of clocking the zoom write address counter 824.

As can be seen, the above line buffer 1215 is controlled in much the same manner as the line buffer 714 of the zoom function 700. However, the data is used in a different manner. Buffers 1234, 1236, 1240 and 1242 are configured to store the above right pixel value, the above left pixel value, the below right pixel value, and the below left pixel value, respectively. More buffers can be added for more sophisticated kernels.

Registers 1234, 1236, 1240 and 1242 work in conjunction with the gated X-carry signal 1298 to store outputs of the above-line-buffer 1215 and incoming pixel data from multiplexer 716 to store above and below left and right values for the filter computation. Whenever the X adder 832 generates a carry, this indicates that the next pixel will be a new original pixel value. Accordingly, the registers are enabled to change on the next clock.

On the next clock, the above-left register 1236 receives the contents of above-right register 1234 and above-right register 1234 receives the output of the above-line buffer 1215, which is then next above-right pixel value. This corresponds, logically, to the process whereas the current output pixel position moves across the screen left to right, it will cross the position of the original value which was formerly used for the value to the right. When the current position crosses the right position, that right pixel is now on the left and should be transferred into the above-left register 1236 and a new right value must be retrieved from the above-line buffer 1215. Sequential access to the above-line buffer 1215 is accomplished by incrementing the address counter 1226 on the rising edge of the carry out of adder 832.

The below-right register 1240 and the below-left register 1242 operate in an identical way on the "below" pixel stream entering from the zoom function.

Two initialization processes are allowed for. The first involves the first line of the zoom area. When the first line is encountered, the contents of the above-line buffer 1215 are indeterminate and cannot be used to load the above-right register 1234. A first filter multiplexer 1246, selected by first-line detected signal 1206, is provided to direct the below-line data to the above-right register 1234 in the place of the data from the above line buffer 1215. This means that the above and below data will be identical until the second line of original data is encountered (when a carry is generated by the Y adder 834) and although the filter is enabled, the calculations will cancel and no vertical filtering will occur.

The second initialization process is the horizontal equivalent of the first-line initialization. At the left edge of the image, the above-right and below-right registers 1234 and 1240 will have indeterminate contents. This is remedied by using the left-edge signal 1248 in two ways. First, an OR gate 1225 combines it with the carry signal 806 to force a shift signal to the four adjacent pixel registers 1234, 1236, 1240 and 1242 to input at the leftmost pixel of the image. Second, it switches second and third filter multiplexers 1250 and 1251 so that the below-left and above-left registers 1236 and 1242 input the same leftmost pixels as the right registers 1234 and 1240.

In this way, the filter registers are put in a known state. Since the left and right registers 1234, 1236, 1240 and 1242 contain the same values, although the filter is enabled, the calculations will cancel and no horizontal filtering will occur. On subsequent new pixel values, when adder 832 generates a carry output 806, the operation of the registers 1234, 1236 1240 and 1242 will normally clock the new values and the filter operation will be fully functional.

To cause the above-line buffer 1215 to store the leftmost pixel, left edge 1248 signal is input to an OR gate 1298 with the output of the X-step flip-flop 1299 to form the input to the AND gate 1230.

With reference to FIG. 2C, the operation of these buffers 1215, 1234, 1236, 1240 and 1242 will be described. When a first original pixel data 212 in a zoom area is output from zoom multiplexer 716, because it is the first original pixel value, the Y-step adder 834 does not cause an enable signal 818 to be generated. Therefore, the first-line-detect signal from the zoom area detector 802 is passed through an OR gate 1232 to an AND gate 1230, the other inputs of which are the horizontal signal from OR gate 1298 and is the zoom-now signal. Thus, an enable signal is generated. To assure that this valid data is input to above-right buffer 1234, a multiplexer 1246 selects the data directly from the output of zoom multiplexer 716 for input into the above-right buffer 1234. The selection signal for the multiplexer 1246 is provided by the first-line detect signal 1206 of the zoom area detector 802. The output causes the multiplexer to select by-pass data from the zoom multiplexer 716.

With reference to FIG. 2C, as pixel 218 is input from zoom multiplexer 716, read operation of the above-line buffer 1215 is enabled, which outputs the pixel value for pixel 214 for storage in the above-right buffer 1234. Simultaneously, the pixel value for pixel 212 is shifted to the above-left buffer 1236 and the pixel value for pixel 218 is stored in the below-right buffer 1240, while the below-left buffer receives the pixel value for pixel 216, shown in FIG. 2C. The output of these buffers 1234, 1236, 1240 and 1242 are input into the filter 1022.

The outputs of the buffers 1234, 1236, 1240 and 1242 are input to the filter 1022. Additionally, the Y fraction and X fraction signals from the current Y-position fraction register 820 and the current X-position fraction register 822, respectively, are input to the filter 1022. Therefore, all the necessary pixel values as well as the distance the interspersed pixel is from original pixel grid is provided to the filter for interpolation.

An acceptable equation for calculating the current is a weighted average of four surrounding pixels, according to a 1×1 kernel interpolation technique is as follows. First, the left and right pixels are averaged by the following equations:

Above=Above_Left+(X_Fraction * (Above_Right–Above_Left))

Below=Below_Left+(X_Fraction * (Below_Right–Below_Left))

Next, the resulting above and below values are averaged according to the following equation:

Result=Above+(Y_Fraction * (Below–Above))

Once the interspersed pixel, such as pixel 210, as shown in FIG. 2C, is determined, the next pixel 211 is determined using the same original pixel data, but with different Y and X fractions.

It should be noted that the filter hardware of the above-described system is expected to output pixels based on the pixel to the right and the pixels to the right may not have been yet presented by the input. A several pixel delay can overcome this problem but the degree of delay can be difficult to determine. To illustrate the problem, in the instance of pixels being dependent on pixels in lines below, with a large replication, these lines can be quite far away within the data stream. To delay and store an unknown number of lines before deciding a pixel value is not practical.

Instead, a solution with a minor visual artifact can be accepted. The hardware does not delay the data. Instead, it simply declines to correct the data until enough data has accumulated. Horizontally, this means that the filtering does not occur until the second unique value appears (such as shown as 214 in FIG. 2). Thus, pixels 220 and 221 remain replicates of pixel 212. As pixel 214, the second value, becomes known, the blending between 212 and 214 can occur. The blends of 212 and 214 are performed used for generating values for pixels 222 and 223 to the right. This produces a shift of the image to the right. A similar vertical calculation delay process shifts the image downward.

In this way, a proper looking image is output with four (4) artifact effects, as listed below. First, the top-most and left-most pixels are not corrected as wide as one replication pattern. Second, the top-most lines of one pixel replication in height are corrected horizontally but not vertically. Third, the smoothed images is shifted right and down one replication pattern width. Finally, fourth, the right-most and bottom-most pixel values are lost.

These effects should not detract excessively from the video image displayed. Since an original image is typically 160×120 pixels or greater, losing 1 pixel from the edge represents less than a 1% error. Moreover, the image typically has some margin of background around the subject of the video enlargement. Likewise, the uncorrected pixels exhibit the same mosaic artifact which comprised the original uncorrected image. The net result is that 99% of the pixels are corrected and 1% are left unchanged.

It should be apparent from the above description that a variety of hardware and software can be substituted for those described or referred to without departing from the present invention. To mention just a few, the monitor 314 can be any suitable display device, such as digital or analog display monitor, a high resolution printer, dye sublimation printer, optical film printer, etc. Other components can be inserted into the system, such as a modem after the DACs 708, 709 and 710 so that the display can be physically remote from the processing circuitry. Additionally, the frame buffer 308 can be a frame store which samples and stores the samples in an input video for readout in synchronization with some condition other than the video input. The data in the frame buffer 308 stores a description of the color at a point, which can be manipulated by graphics software. Also, the frame buffer 308 can be in the form of a single-buffered frame buffer, which stores an entire frame, a double-buffered frame buffer for simultaneous updating and reading of the frame buffers, a line buffer or no buffer at all, wherein the computer generates data at video speeds. As mentioned above, the present invention is operative for both still and motion images.

The inputs 704 of FIGS. 7 and 10 can be any one or any combination of inputs from the graphics controller 306, or from a video RAM or frame buffer 308 or from any suitable source of graphics data containing color numbers just as with the pixel data 704 of FIG. 7. The present invention is advantageous in that it can operate using only a single stream of data. The manner of generation of the inputs 704 depends on the needs and capability of the overall system, as well as the desires of the operator.

In another alternative embodiment, the DACs 708, 709 and 710 can be omitted when using a digital display, such as a liquid crystal display (LCD). This can be the preferred implementation when multiple screens are to be display simultaneously either adjacent to one another or in layers because the processing and hardware required for digital display signals is simpler than analog display signals.

Alternatively or additionally, a chroma-key bit map can be used rather than the counting mechanism shown in FIGS. 8 and 12. A chroma-key bit map identifies where an image is to be filtered and where it is not to be filtered by inserting predetermined color values, or chroma-keys, at appropriate locations. For computer graphics, the chroma-key can be a single color value or bit. For real life video images, where colors do not assume a uniform single value, a range of values can form the chroma-key. This sort of system is commonly used in broadcasting weather forecasts where an image of a weatherman standing in front of a blue screen (with values within the range of the chroma-key) and an image of a computer-generated weather map are combined. Each time the video data stream of the weatherman image includes a chroma-key value, the pixel is replaced with a pixel value from the graphics data.

In a 16 bit system (where the color values are represented by 5 bit red, green and blue values), the 16th bit can be used as a chroma-key. In a 32 bit system (wherein red, blue and green colors are represented by 8 bits each), the chroma key can be represented in the extra 8 bits. In a 24 bit system, a color or range of colors can be reserved as the chroma-key.

The invention disclosed herein is also useful for non-RGB color spaces such as grey-scale, YUV, CMYK, HSL and YCC.

In light of these and other variations, it is apparent that the scope of the invention is to be determined by the claims appended hereto including the range of all equivalents of the recitations appearing therein, and not from the exemplary embodiments described herein.

What is claimed is:

1. A RAMDAC for converting graphics data into analog display signals, comprising:
    a color look-up table for converting incoming image data into corresponding color image data;
    a line buffer for storing original image data and for generating a zoomed line of image data;
    means for switching between color data from the color look-up table corresponding to image data that is not within a zoom area and zoomed line data from the line buffer corresponding to image data within a zoom area;
    a plurality of digital to analog converters for converting the color data or zoomed line data to analog video signals; and
    zoom control means for enlarging a portion of image data by generating a write and read address and signals for controlling the line buffer and switching means wherein,
    the zoom control means selectively enables the line buffer to store original image data and to read out original image data from said line buffer to create an enlarged display image.

2. A RAMDAC according to claim 1 wherein the zoom control means further comprises:
    zoom detector means for monitoring horizontal and vertical blank signals to determine if a current position of a raster scan is within a zoom area or a zoom exclusion area and generating a zoom now signal;
    means for interrupting a zoom now signal when the raster scan is within a zoom exclusion area; and
    means for enabling the selection means to read and output the zoomed data in the line buffer in response to the zoom now signal.

3. A RAMDAC according to claim 2 wherein the zoom detector means further comprises a set of counters and comparator to determine when a raster is above, to the left of, and within a zoom area and wherein the zoom detector has stored constants which indicate the start and end coordinates of the zoom area.

4. A RAMDAC according to claim 2 wherein said zoom exclusion areas are temporary screen items including cursors and pull-down menus.

5. A RAMDAC according to claim 3 wherein the zoom detector means generates a left-of-zoom-area signal in response to a horizontal blank signal and an above-zoom-area signal in response to a vertical blank signal to provide zoom control initialization.

6. A RAMDAC according to claim 2 wherein the zoom control means further comprises:
    a vertical unit for determining when a line of original image data is input into the RAMDAC, and for enabling the line buffer to store the line of original image data; and
    a horizontal unit for identifying original image data in the image data stored in the line buffer, and for horizontally enlarging the original image data and outputting the enlarged image data to the line buffer.

7. A RAMDAC according to claim 6 wherein the vertical unit includes a Y-step register, a current Y-position fraction register and an adder; and the horizontal unit includes an X-step register, a current X-position fraction register and adder.

8. A RAMDAC according to claim 1 further comprising:
    a bypass means for bypassing the color look-up table when the images are stored in a color format; and
    a second selection means for alternatively enabling the color look-up table or by-pass means.

9. A graphics controller for converting data into analog display signals comprising:
    a line buffer for storing image refresh data and for generating a zoomed line of image data;
    means for switching between image refresh data that is not within a zoom area and zoomed line data from the line buffer corresponding to original image refresh data within a zoom area; and
    zoom control means for enlarging a portion of the image refresh data by generating a write and read address and signals for controlling the line buffer and switching means wherein,
    the zoom control means selectively enables the line buffer to store original refresh image data and to read out the line buffer contents to create an enlarged display image.

10. A graphics controller according to claim 9 wherein the zoom control means further comprises:
    zoom detector means for monitoring horizontal and vertical blank signals to determine if a current position of a raster scan is within a zoom area or a zoom exclusion area and generating a zoom now signal;
    means for interrupting a zoom now signal when the raster scan is within a zoom exclusion area; and
    means for enabling the selection means to read and output the zoomed data in the line buffer in response to the zoom now signal.

11. A graphics controller according to claim 10 wherein the zoom detector means further comprises a set of counters and comparator to determine when a raster is above, to the left of, and within a zoom area and wherein the zoom detector has stored constants which indicate the start and end coordinates of the zoom area.

12. A graphics controller according to claim 10 wherein said zoom exclusion areas are temporary screen items including cursors and pull-down menus.

13. A graphics controller according to claim 11 wherein the zoom detector means generates a left-of-zoom-area signal in response to a horizontal blank signal and an above-zoom-area signal in response to a vertical blank signal to provide zoom control initialization.

14. A graphics controller according to claim 10 wherein the zoom control means further comprises:
    a vertical unit for determining when a line of original image refresh data is input into the controller, and for enabling the line buffer to store the line of original image data; and
    a horizontal unit for identifying original image refresh data in the image data stored in the line buffer, and for horizontally enlarging the original image data and outputting the enlarged image data to the line buffer.

15. A graphics controller according to claim 14 wherein the vertical unit includes a Y-step register, a current Y-position fraction register and an adder; and the horizontal unit includes an X-step register, a current X-position fraction register and adder.

16. A method of enlarging still pictures and full motion video in a display comprising the steps of:

A. selecting a zoom area within an image area wherein the zoom area includes original pixels to be enlarged;

B. storing the original pixels in locations spaced apart by zooming constants as scan lines in an intermediate frame buffer, the remainder of the scan lines containing insignificant pixels that will be overwritten in a zoomed image;

C. determining if a scan line in the intermediate frame buffer contains the original pixels to be enlarged;

D. reading the scan line into a single line buffer only if the scan line contains original pixels creating a zoomed line to be displayed;

E. writing from the line buffer the zoomed line and displaying it;

F. reading the next scan line from the intermediate frame buffer; and

G. repeating steps C, D, E, F, for all scan lines in the intermediate buffer.

* * * * *